United States Patent [19]
Knerr et al.

[11] Patent Number: 4,852,611
[45] Date of Patent: Aug. 1, 1989

[54] WELLHEAD CONNECTION OF HYDRAULIC CONTROL LINES

[75] Inventors: Edwin R. Knerr, Houston, Tex.; Robert Hart, Middlesex, England; William S. Cowan, Houston, Tex.

[73] Assignee: National Oil Well (U.K.) Limited, Great Britain

[21] Appl. No.: 97,490

[22] Filed: Sep. 16, 1987

[30] Foreign Application Priority Data

Sep. 16, 1986 [GB] United Kingdom ............... 8622311

[51] Int. Cl.$^4$ ............................................. F16L 37/28
[52] U.S. Cl. ................................ 137/595; 137/614.04
[58] Field of Search ................... 137/594, 595, 614.04; 251/149.6

[56] References Cited

U.S. PATENT DOCUMENTS

| 2,451,218 | 10/1948 | Hengst | 137/614.04 |
| 2,966,371 | 12/1960 | Bruning | 137/614.04 |
| 3,937,251 | 2/1976 | Ahlstone et al. | 137/594 |
| 4,703,774 | 11/1987 | Seehausen | 137/614.04 |

FOREIGN PATENT DOCUMENTS 2732440 1/1978 Fed. Rep. of Germany ... 251/149.6
2097885 11/1982 United Kingdom .
2132728 7/1984 United Kingdom .

Primary Examiner—Stephen Hepperle
Attorney, Agent, or Firm—Roylance, Abrams, Berdo & Goodman

[57] ABSTRACT

A connector assembly for connecting hydraulic lines in a control stab module assembly has an inner annular ring (27) having a plurality of radially outwardly facing ports (28) for the passage of hydraulic fluid therethrough, and an outer annular ring (1) having a plurality of radially inwardly facing ports (2) for the passage of hydraulic fluid therethrough. The inwardly facing ports (2) are arranged to be aligned with the outwardly facing ports (28) when the outer ring (1) is positioned about the inner ring (27). Each port comprises a first valve member (16, 33) which is resiliently biassed to a closed position to close the port, and urging means (53) are provided to urge the first valve member (16, 33) into an open position against the biassing means (17, 33) when said rings (1, 27) are positioned one about the other. Sealing means (25) are provided to seal an inwardly facing port (2) with an aligned outwardly facing port (28). Latching means for connecting the inner and outer rings (27, 1) are also provided.

6 Claims, 9 Drawing Sheets

WELLHEAD CONNECTION OF HYDRAULIC CONTROL LINES

FIELD OF THE INVENTION

The present invention relates to apparatus for the remote connection and disconnection of hydraulic control lines at a subsea wellhead.

PRIOR ART

A number of operating functions, such as valve control, on a subsea wellhead christmas tree are controlled hydraulically. It is desirable to control these in two modes, a production mode and a workover mode.

During the production mode, hydraulic lines from the valves and other functions are typically fed to a control pod mounted on the christmas tree and from there to a production platform.

During the workover mode the hydraulic lines between the functions and the control pod are generally disconnected and the lines from the functions connected to control lines from the workover riser.

This disconnection and reconnection of the lines is achieved by a control stab module assembly which comprises an inner annular ring mounted on the christmas tree and having a plurality of pairs of ports. A first port of each pair is connected to a hydraulic line to a respective function and a second port of each pair is connected to a hydraulic line to the control pod.

Two outer annular rings are arranged to mate with the inner annular ring. A first of these outer rings comprises pairs of ports which connect with the pairs of ports on the first ring, and bridge pipes are provided which connect the ports of each pair on the outer ring, so as to provide, in effect, a connection between the ports of each pair in the first ring. Thus hydraulic control is fed from the tree mounted pod, through a port on the inner ring, a port on the outer ring, then back through the bridge pipe to a port on the outer ring and the respective port on the inner ring and so on to the hydraulic function. The outer ring is mounted on the high pressure corrosion cap which is fitted to the wellhead during the production mode.

The second outer ring comprises a number of ports which may be connected with hydraulic control lines to the workover platform and which may connect with those ports on the inner ring which are connected to the functions on the tree, the ports on the first ring which are connected to the control pod being made redundant. The second outer ring is mounted on the running/re-entry tool or B.O.P. and is connected to the inner ring when the re-entry tool of B.O.P. is landed on the re-entry hub.

SUMMARY OF THE INVENTION

A first aim of the invention is to provide an improved arrangement for forming a fluid-tight connection between the ports on the inner and outer rings of the control stab module assembly, e.g. at the interface between the re-entry tool and the tree hydraulic system. A second aim of the invention is to provide a novel arrangement for latching together the rings of the control stab module assembly.

A first aspect of the invention provides a connector assembly for connecting hydraulic lines in a control stab module assembly, the control stab module assembly comprising an inner annular ring having a plurality of radially outwardly facing ports for the passage of hydraulic fluid therethrough, and an outer annular ring having a plurality of radially inwardly facing ports for the passage of hydraulic fluid therethrough, said inwardly facing ports being arranged to be aligned with said outwardly facing ports when the outer ring is positioned about the inner ring, wherein a said port comprises a first valve member which is resiliently biassed to a closed position to close the port, urging means being provided to urge the first valve member into an open position against said biassing means when said rings are positioned one about the other.

Preferably, sealing means is provided to seal a said inwardly facing port with an outwardly facing port aligned therewith, the arrangement being such that the sealing effect of said sealing means is enhanced when pressurized hydraulic fluid passes through said aligned ports.

Preferably a forward end of the first valve member projects beyond the circumferential surface of the respective ring when in the closed position and is urged rearwards, against the biassing means, as the rings are brought together.

Preferably a second valve member is provided, said second valve member surrounding said first valve member and being resiliently biassed radially of the respective ring member, said second valve member being provided with said sealing means, e.g., in the form of a sealing face forming a fluid tight seal with the other ring. Preferably the respective first valve member is slidable within the second valve member.

Preferably the first valve member carries a shoulder which abuts against a shoulder of a housing or the respective second valve member when in the closed position to form a seal thereagainst.

Preferably a stop is provided to limit rearward movement of the first valve member.

Preferably a port in the outer ring extends radially through the thickness of the ring and is closed at its radially outer end by a removable plug, the valve member(s) in the port being removable through the outer end of the port.

Preferably an aperture is provided in a side wall of a port for connection of a hydraulic fluid line thereto.

A second aspect of the invention provides latching means for connecting inner and outer rings of a control stab module assembly, said latching means comprising a latch member which is mounted on or in a first ring to be radially slidable thereof, said latch member engaging in a recess in the second ring to prevent relative axial movement of the rings, and means for locking the latch member in engagement in said recess.

Preferably the latch member is resiliently biassed to said engagement position. Preferably the locking means comprises a pin which extends through an aperture in said latch and a corresponding aperture in the first ring to prevent relative movement of the latch and the first ring.

Preferably the first ring is resiliently mounted on a vertically movable member which also carries the pins. After the first ring is landed around the second ring the member is urged downwardly, compressing the resilient mounting of the first ring and causing the pins to penetrate the latch members.

Preferably the movable member is mounted on a corrosion cap or workover assembly which workover assembly is landed at the wellhead. Very preferably the movable member comprises a movable piston member which operates to effect clamping of the corrosion cap or workover assembly on the wellhead re-entry hub.

BRIEF DESCRIPTION OF THE DRAWINGS

The invention will be further described by way of example with reference to the accompanying drawings, in which.

DETAILED DESCRIPTION OF THE DRAWINGS

Figure 1:
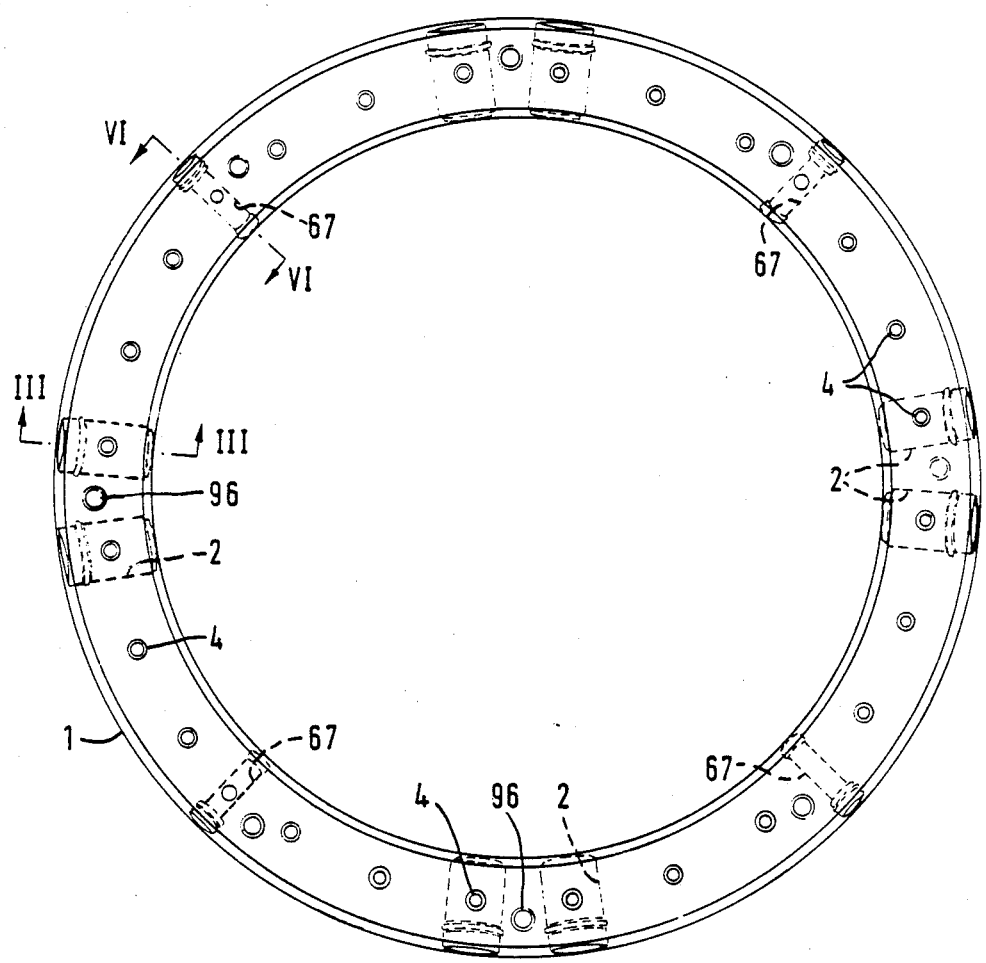
FIG. 1 is a plan view of an outer ring of a first embodiment of a control stab module assembly.
Figure 2:
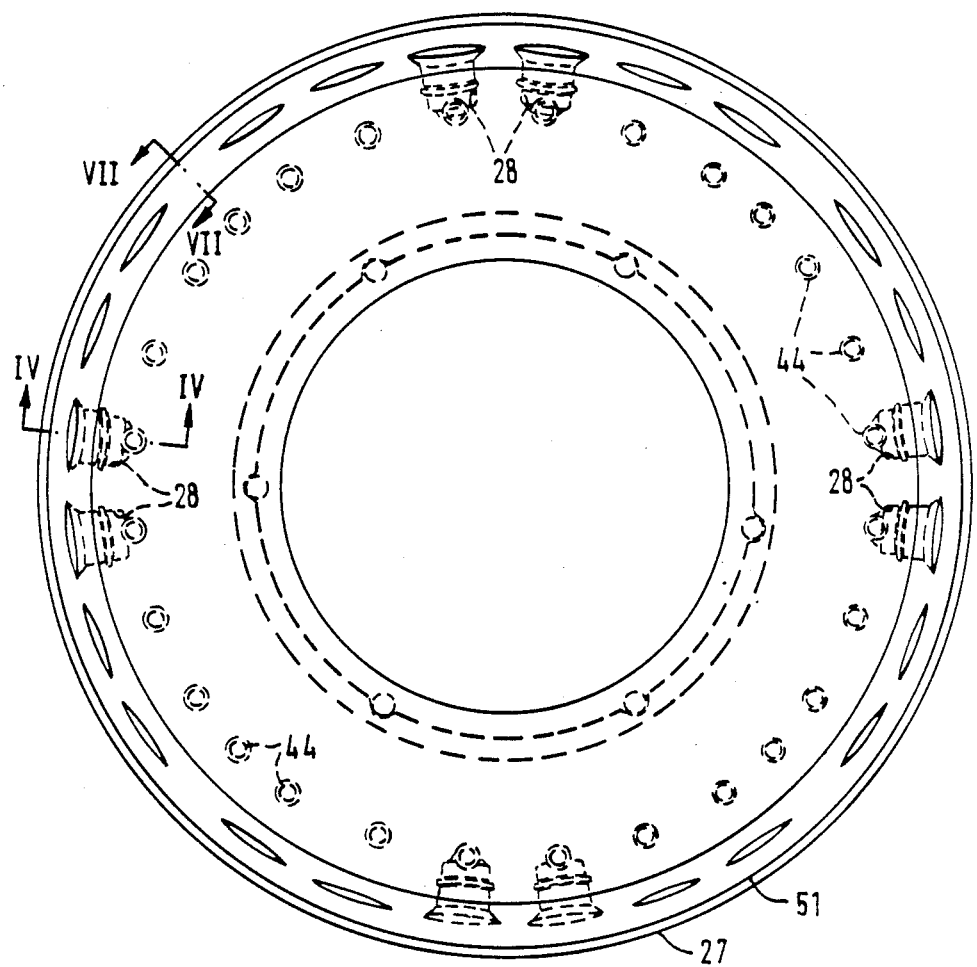
FIG. 2 is a plan view of an inner ring of the first embodiment of a control stab module assembly.
Figure 3:
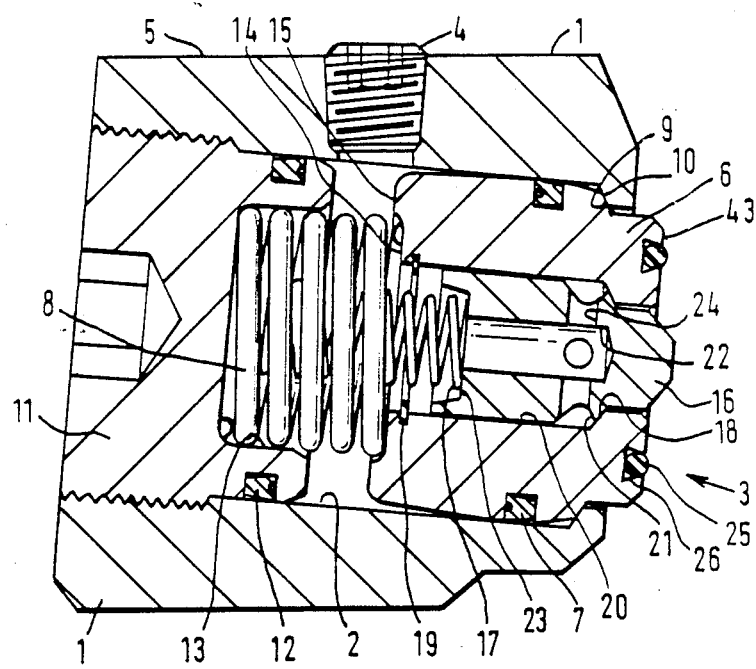
FIG. 3 is an enlarged cross-section along the line III—III of FIG. 1, showing a first valve arrangement.

A first embodiment of a control stab module assembly shown in FIGS. 1 to 7 comprises an integrally formed outer ring 1 having twenty four evenly spaced radially extending through bores 2 (eight are shown in outline in FIG. 1), each of which may carry a valve assembly 3 (FIG. 3). A port 4 is formed in the upper surface 5 of the ring 1 for connection of a hydraulic line, as described hereinafter.

The valve assembly 3 comprises an outer, cylindrical sealing plunger 6 which is sealed fluid tightly to the wall of the bore 2 by an annular seal 7. Plunger 6 is slidable within the bore 2 and is urged radially inwardly of the ring 1 by a spring 8. A shoulder 9 on the plunger 6 abuts against a shoulder 10 at the inner end of the bore to retain the plunger therein. A closure member 11 is screw-fitted in the outer end of the bore 2. A seal 12 forms a fluid tight seal between the closure 11 and the wall of the bore 2. Spring 8 sits in a cup 13 formed in the inner face of the closure member 11 and bears on a shallow cupped recess 14 formed in an inner end wall 15 of the plunger 6.

A hexagonal recess is formed in the outer surface of closure member 11 to receive an allen key for screwing the member 11 into the bore 2.

A poppet valve 16 is slidably mounted in the cylinder of plunger 6.

A spring 17 urges the poppet valve 16 radially inwardly of the ring 1, a shoulder 18 on the poppet valve abutting against a shoulder 21 on the inner wall 20 of the plunger 6. Poppet valve 16 may be urged outwards against spring 17 as far as a stop 19 located in a recess in the inner wall 20 of the plunger 6.

An axial bore 22 extends through the poppet valve 16 from an end wall 23 as far as two or more radial bores 24.

An 'O' ring 25 is received in an annular recess 26 in the radially inner end face of the plunger 6.

The valve assembly as shown in FIG. 3 is in its closed position. The plunger 6 and poppet valve 16 preventing the ingress of sea water into the chamber formed by bore 2 and so contamination of any hydraulic fluid line connected to port 4.

Closure member 11 may be unscrewed from the bore to remove plunger 6 and poppet valve 16.

FIG. 2 shows an inner ring 27 which has twenty four evenly spaced blind bores 28 arranged to line up with the through bores 2 of outer ring 1. In this embodiment, each bore 28 houses a valve assembly 29 (FIG. 4).

Valve assembly 29 comprises a cylinder 30 which is screwed into the bore 28. An 'O' ring seal 31 is housed in a circumferential recess 32 in the cylinder 30 to form a fluid-tight connection with the bore 28. A poppet valve 33 is slidable in the inner bore 34 of the cylinder 30. Poppet valve 33 is urged radially outwardly of the ring 27 by a spring 25 which bears against end 36 of the bore 28 and rests in a recess 37 in an end wall 38 of poppet valve 33. A shoulder 39 on poppet valve 33 engages with a shoulder 40 on cylinder 30 to form a seal therewith closing the bore 28. Poppet valve 33 is shown partially open, i.e. retracted into the bore 34 of the cylinder 30. A stop 41 limits the inward movement of poppet valve 33. Cylinder 30 has a planar outer face 42 for mating with the outer face 43 and 'O' ring 25 of plunger 6 of valve assembly 3.

A port 44 provides access for a hydraulic line to the bore 28. As for poppet valve 16, poppet valve 33 has an axial bore 45 connecting with at least two radial bores 46.

Figure 4:
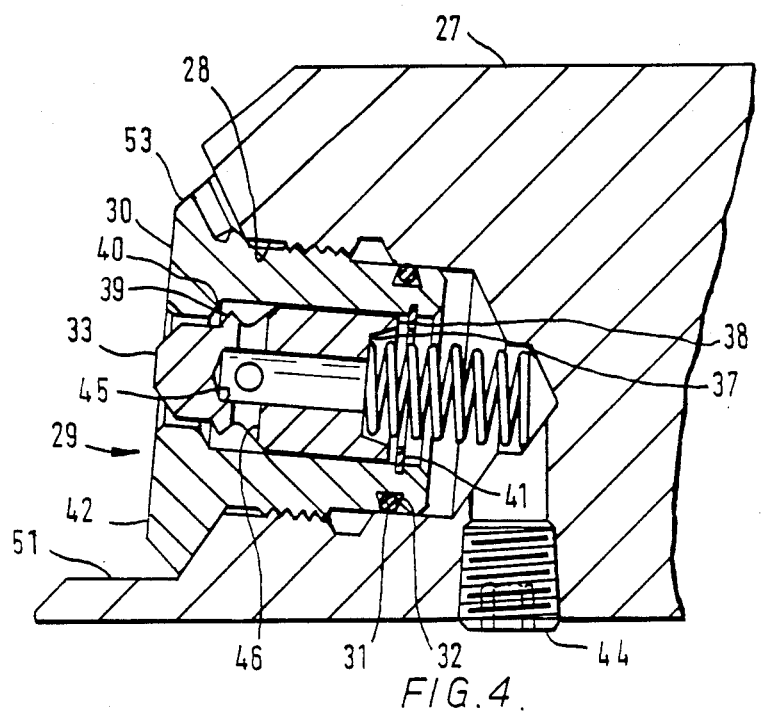
FIG. 4 is an enlarged cross-section along the line IV—IV of FIG. 2, showing a second valve arrangement.
Figure 5:
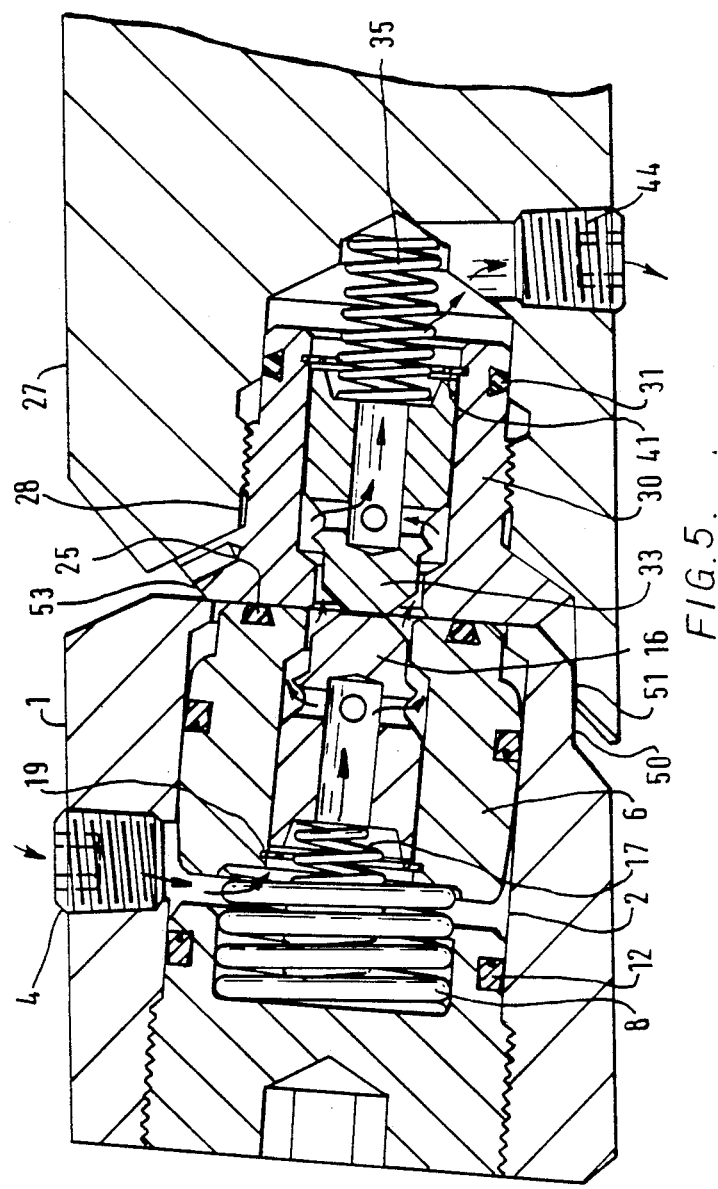
FIG. 5 is a cross-section showing the valve arrangements of FIGS. 3 and 4 with the rings assembled.

FIG. 5 shows a cross-section through the valve assemblies of FIGS. 3 and 4 when the rings 1, 27 are assembled together, that is with the cooperating valves open.

In use, the inner ring 27 is typically bolted on the christmas tree, with a degree of lateral play. The outer ring is mounted on the corrosion cap of workover assembly (vide hereinafter) and is landed about the inner ring. The outer ring has a shoulder 50 which rests on a lip 51 of the inner ring. The circumferential faces of the rings and the valve assemblies are angled to the ring axis to guide the outer ring over the inner ring during assembly. As the outer ring 1 is slid over the inner ring the plunger 6 will ride over shoulder 53 on cylinder 30, the plunger being urged against the force of spring 8, so that face 43 of the plunger abuts face 42 of cylinder 30 of the valve assembly 29.

Similarly the poppet valves 16, 33 will abut one another so that both valves are urged back against their respective springs, 17, 35, to open the valve assemblies. Hydraulic fluid may then pass either way along the passage from inlet 4, through the bores of poppet valves 16, 35, to inlet 44. Hydraulic lines, or bridging pipes as required, remain connected to the threaded inlets 4, 44 during assembly of the module as is known in the art.

It is an important feature of the present invention that the pressure of hydraulic fluid in chamber 2 of valve assembly 1 will urge plunger 6 against cylinder 30, enhancing the seal formed between the valve assemblies by 'O' ring 25. This is effected by ensuring that the surface area of the annular seal 7 is greater than the inner surface area of the 'O' ring 25, so as to produce a net force on the plunger 6 against the cylinder 30.

Typically, it may be necessary to control 10 functions in the production mode, requiring 20 ports on the inner ring and the outer ring which is attached to the corrosion cap. A further 4 ports are provided for functions which may be controlled during workover, requiring a total of 24 ports on the inner ring and 14 associated ports (10+4) on the outer ring carried by the workover assembly. In practice 24 ports may be provided in each ring, and the appropriate valve assemblies only fitted to the respective outer rings.

The mechanism for latching the outer ring on the inner ring will now be described with reference to FIGS. 6 to 8.

Figure 6:
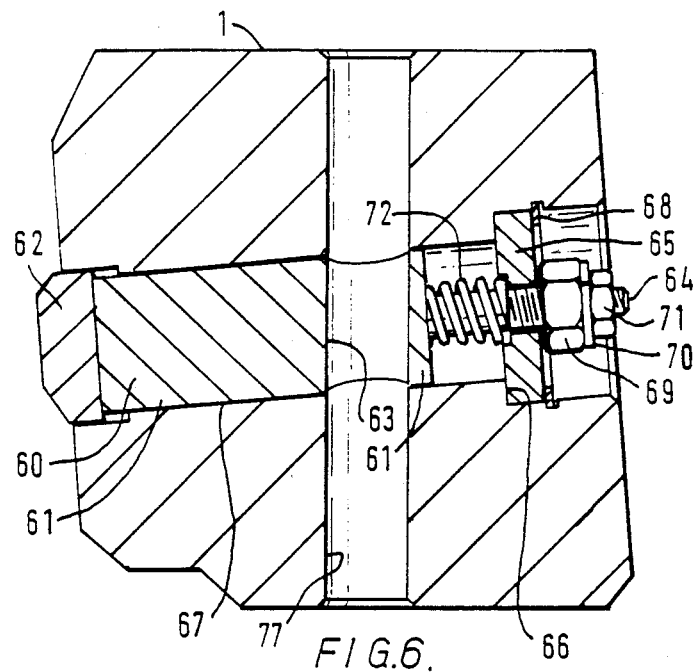
FIG. 6 is an enlarged cross-section along the line VI—VI of FIG. 1.

FIG. 6 shows a latch assembly housed in the outer ring 1. A latch member 60 is slidably mounted in a bore 67 extending radially through the annular ring 1. Latch member 60 comprises a shaft 61 having a head 62. Shaft 61 has a through bore 63. The shaft 61 is mounted at its radially outer end on a bolt 64 which extends through a washer 65 held in a recess 66 in the outer end of bore 67 by a retaining ring 68. A nut 69, washer 70 and locking nut 71 retain the shaft 61 in position in the bore 67 against a spring 72 which urges the shaft 61 radially inwards of the ring.

Figure 7:
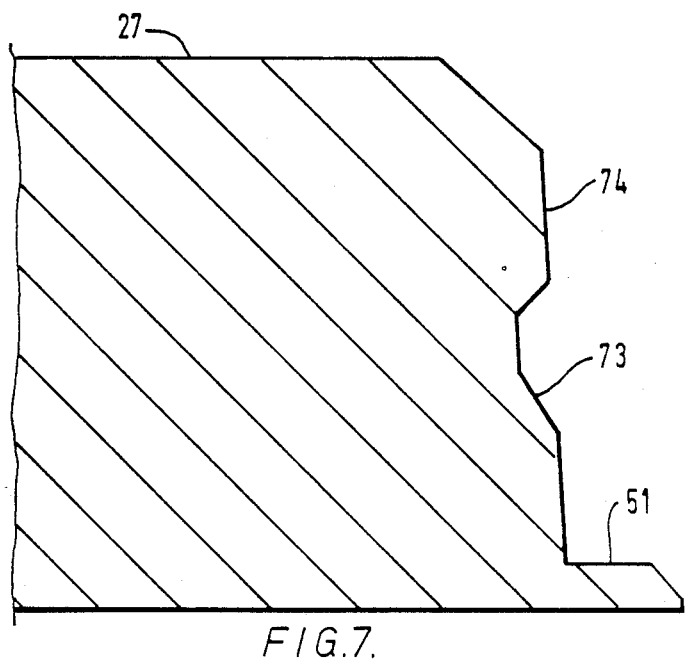
FIG. 7 is an enlarged cross-section along the line VII—VII of FIG. 2.

The head 63 of shaft 61 is arranged to engage in a recess 73 in the outer circumferential surface of inner ring 27 (FIG. 7). As the outer ring 1 is slid over the inner ring 27, the head 62 of shaft 61 rides over the outer circumferential shoulder on face 74 of the inner ring 27, compressing spring 72, until engaging in recess 73.

After the rings have mated together a pin 76 (FIG. 8) is passed through bore 77 in the ring 1 and the bore 63 in the shaft 61, to lock the shaft in position preventing retraction of head 62 from the recess 73, thus locking the rings 1, 27 together.

Figure 8:
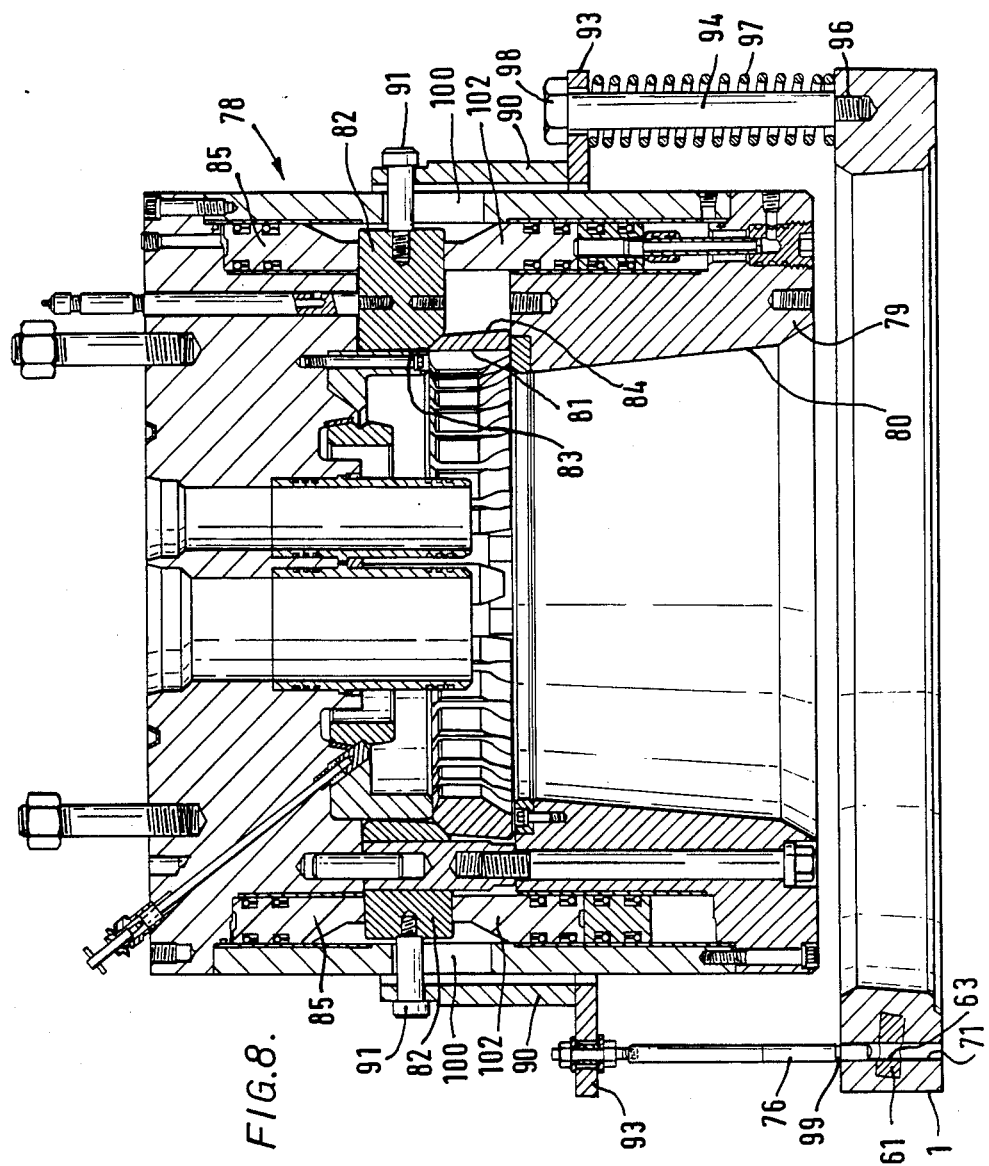
FIG. 8 is a vertical cross-section through a part of a well-head workover assembly showing an arrangement for mounting the ring of FIG. 1 thereupon.
Figure 9:
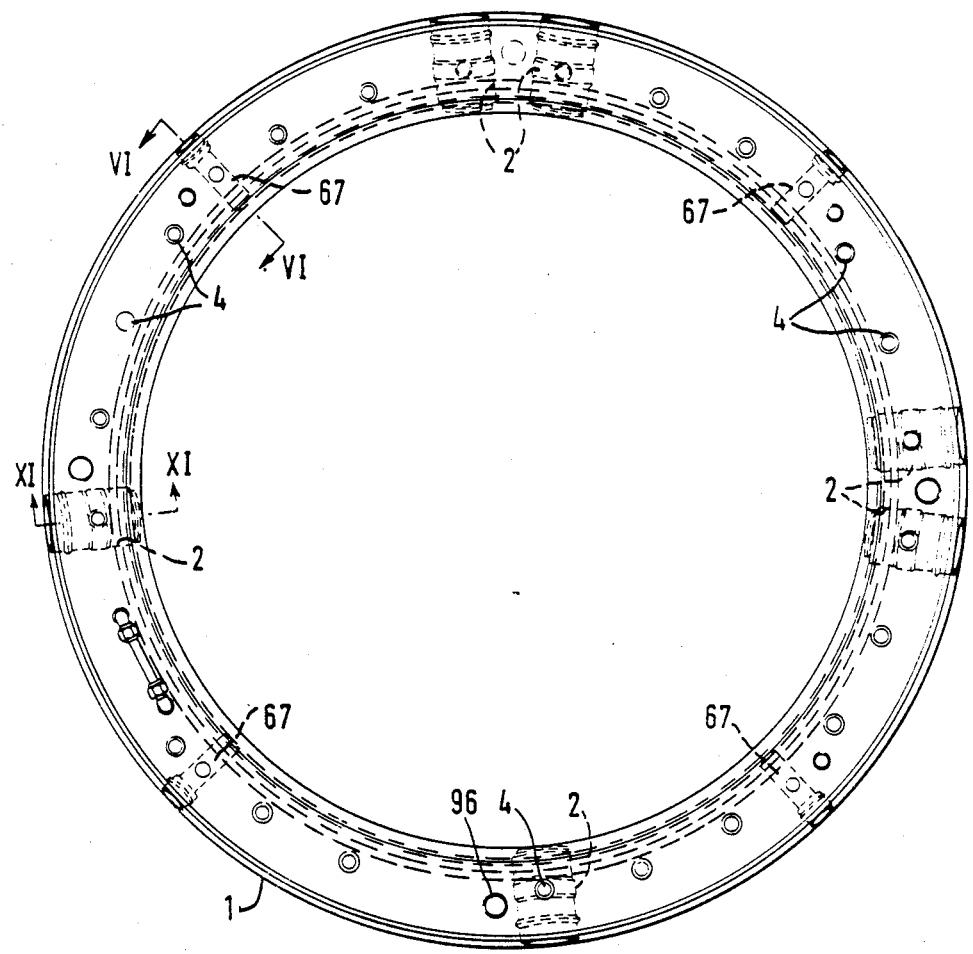
FIG. 9 is a plan view of an outer ring of a second embodiment of a control stab module assembly.
Figure 10:
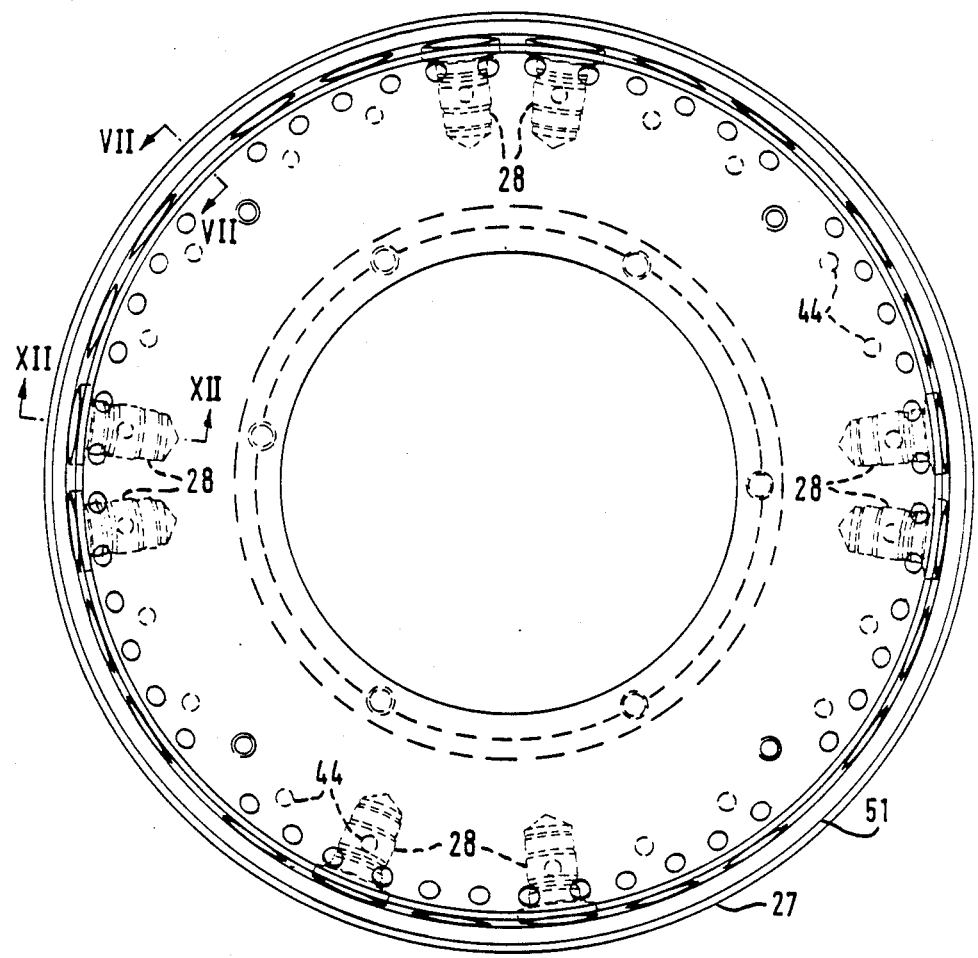
FIG. 10 is a plan view of an inner ring of the second embodiment of a control stab module assembly.
Figure 11:
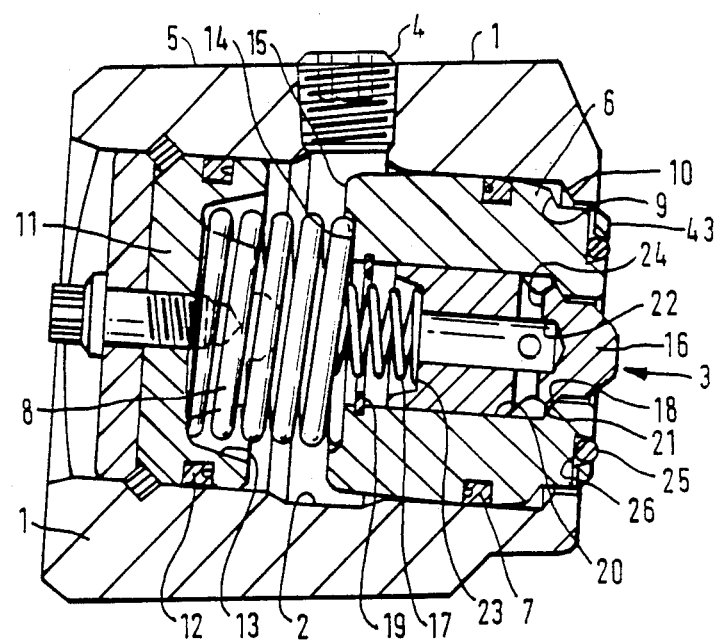
FIG. 11 is an enlarged cross-section along the line XI—XI of FIG. 9, showing a third valve arrangement.
Figure 12:
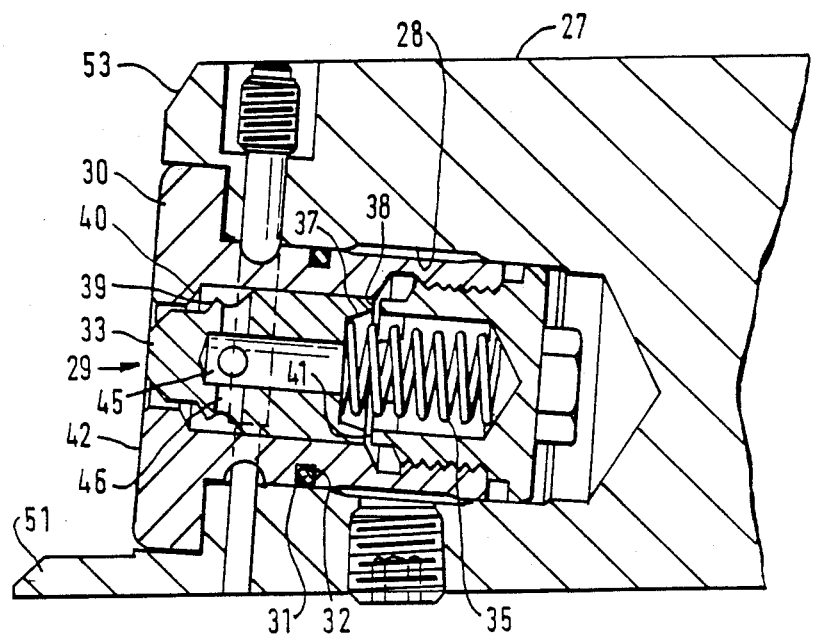
FIG. 12 is an enlarged cross-section along the line XII—XII of FIG. 10, showing a fourth valve arrangement.

FIG. 8 shows an outer ring 1 mounted on a lower part of a workover assembly 78. The workover assembly 78 is known generally in the art and will not be described in detail except where necessary to illustrate the latching mechanism of the invention. The workover assembly 78 is landed and clamped onto a re-entry hub on the christmas tree (not shown).

A collar 79 having a tapered inner wall 80 slides over the re-entry hub. A compressible ring 81 is then compressed to clamp the workover assembly on the re-entry hub. Ring 81 is compressed by a cylindrical piston 82 which has a tapered inner surface 83 which rides over the outer surface 84 of ring 81. The piston 82 is driven downwards as seen in FIG. 8 by a hydraulically operated arm 85. This is known in the art.

Outer ring 1 is suspended from the piston 82. A collar 90 surrounds the workover assembly and is bolted 91 to the piston 82. Bolts 91 sliding in elongate apertures 100 in an outer wall 101 of the workover assembly. An annular flange 93 is welded to a lower end of the collar 90.

Ring 1 is suspended from flange 93 by a plurality of bolts 94, for example 4 in number, which slide in apertures 95 in the collar 93. The bolts 94 are screwed into threaded holes 96 in the outer ring 1. Springs 97 urge the ring 1 downwards, the heads 98 of the bolts 94 bearing against the flange 93.

The length of the bolts 94 is arranged so that as the workover assembly 78 is landed on the re-entry hub, the ring 1 will just mate with the inner ring 27. Once the workover assembly 78 is landed the piston 82 is driven downwards to clamp the ring 81 on the re-entry hub. As the piston 82 moves downwards, and the ring 1 has mated fully with inner ring 27 which is attached to the wellhead, springs 97 will compress to allow further downward movement of the piston 82. At this stage, pins 76 which are attached to flange 93 will penetrate the bores 63 in the latch members 60, thus locking the latch members in position, as described above.

A recess 99 on the pin 76 is provided to aid alignment during attachment of the ring 1 to the workover assembly 85, and furthermore the recess 99 allows accurate vertical positioning of the pin 76 on assembley.

To release the workover assembly 85 and ring 1, the piston 82 is driven upwardly by ram 102 to release the clamping ring 81. This will at the same time withdraw pins 76 from the latch members 61. As the workover assembly is lifted from the wellhead the latch heads 62 ride out of the recesses 73, the latch member 61 moving against springs 72.

As the valve assemblies 3, 29 clear one another the poppet valves 16, 33 will be urged outwards by their respective springs to seal the hydraulic lines against ingress of dirt and sea water.

The second embodiment shown in FIGS. 9 to 12 is a modified version of the first embodiment described above. Corresponding parts are labelled identically with those described with reference to the first embodiment and operate in an identical way thereto. The modifications made are of a minor nature and reduce production costs, ease assembly and aid maintenance. No detailed description of the second embodiment will be given since the operation thereof is readily apparent from the description of the first embodiment.

Various modifications will be apparent to those in the art and it is desired to include all such modifications as fall within the scope of the patent warranted hereon.

We claim:

1. A connector assembly for connecting hydraulic lines in a control stab module assembly, the connector assembly comprising:

an inner annular ring;

a plurality of radially outwardly facing ports in said inner annular ring for the passage of hydraulic fluid therethrough;

an outer annular ring;

a plurality of radially inwardly facing ports in said outer annular ring for the passage of hydraulic fluid therethrough, said inwardly facing ports being arranged to be aligned with said outwardly facing ports when said outer ring is positioned about said inner ring;

a plurality of first valve members arranged in said ports;

biassing means for resiliently biassing said first valve members to a closed position for closing said ports;

urging means for urging said first valve members into an open position against said biassing means when said rings are positioned one about the other;

sealing means for sealing a said inwardly facing port with a said outwardly facing port aligned therewith;

means for enhancing the sealing effect of said sealing means when pressurized hydraulic fluid passes through said aligned ports;

said sealing means comprising a sealing face for forming a fluid-tight seal between said rings;

a plurality of second valve members, each surrounding one of said first valve members;
further biassing means for resiliently biassing said second valve members radially with respect to said respective ring member, said second valve members being provided with said sealing means,
each of said first valve members being slidable within one of said second valve members;
a first shoulder on each of said first valve members; and
a second shoulder on each of said second valve members, each of said first shoulders abutting against one of said second shoulders when in said closed position to form a seal thereagainst.

2. A connector assembly as claimed in claim 1, wherein said outer and inner rings each have twenty-four evenly spaced ports.

3. A connector assembly as claimed in claim 1, further comprising:
a forward end of each of said first valve members;
an outer circumferential surface of said inner annular ring;
an inner circumferential surface of said outer annular ring, said forward ends of said first valve members located in said radially outwardly facing ports projecting beyond said outer circumferential surface when in said closed position and said forward ends of said first valve members located in said radially inwardly facing ports projecting beyond said inner circumferential surface when in said closed position, and said forward ends of said first valve members being urged resiliently against said biassing means by said urging means as said rings are brought together.

4. A connector assembly as claimed in claim 3, further comprising:
stop means for limiting rearward movement of said first valve member.

5. A connector assembly as claimed in claim 1, wherein said radially inwardly facing ports extend radially through the thickness of said ring, said assembly further comprising:
removable plug means for closing said radially inwardly facing ports at the radially outer ends thereof, the valve members in said ports being removable through the outer ends of said ports.

6. A connector assembly as claimed in claim 1, further comprising:
apertures in side walls of said ports for connection of a hydraulic fluid line thereto.

* * * * *